United States Patent
Shibata et al.

(10) Patent No.: US 9,481,291 B2
(45) Date of Patent: Nov. 1, 2016

(54) VEHICLE LAMP

(71) Applicant: KOITO MANUFACTURING CO., LTD., Tokyo (JP)

(72) Inventors: Hiroki Shibata, Shizuoka (JP); Masashi Tatsukawa, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 97 days.

(21) Appl. No.: 14/262,273

(22) Filed: Apr. 25, 2014

(65) Prior Publication Data

US 2014/0321132 A1 Oct. 30, 2014

(30) Foreign Application Priority Data

Apr. 26, 2013 (JP) ................................. 2013-094400

(51) Int. Cl.

| F21V 17/02 | (2006.01) |
|---|---|
| B60Q 1/068 | (2006.01) |
| B60Q 1/076 | (2006.01) |
| B60Q 1/115 | (2006.01) |
| F21S 8/10 | (2006.01) |

(52) U.S. Cl.
CPC ............. *B60Q 1/0683* (2013.01); *B60Q 1/076* (2013.01); *B60Q 1/115* (2013.01); *F21S 48/1216* (2013.01); *F21S 48/1721* (2013.01); *F21S 48/1778* (2013.01); *F21S 48/328* (2013.01)

(58) Field of Classification Search
CPC .................................... F21S 48/1715–48/1721
USPC ................................................... 362/512–513
See application file for complete search history.

(56) References Cited

U.S. PATENT DOCUMENTS

| 2008/0112179 A1* | 5/2008 | Tatara | B60Q 1/072 |
| | | | 362/515 |
| 2008/0247182 A1* | 10/2008 | Yasuda | B60Q 1/076 |
| | | | 362/465 |

FOREIGN PATENT DOCUMENTS

JP 2012-043656 A 3/2012

* cited by examiner

*Primary Examiner* — Sean Gramling
(74) *Attorney, Agent, or Firm* — Osha Liang LLP

(57) ABSTRACT

A vehicle lamp includes a light source, a projection lens through which at least a portion of light emitted from the light source passes, and an adjustment mechanism configured to adjust a reference position of an optical axis of the projection lens. The adjustment mechanism includes a first member having a movement axis, a second member holding the first member, a first screw arranged to adjust the reference position in a first direction, and a second screw arranged to adjust the reference position in a second direction intersecting the first direction. The first member is arranged such that the movement axis is positioned on a plane perpendicular to the optical axis and including a focal point of the projection lens. An action by a rotation of the first screw and an action by a rotation of the second screw are applied to one of the first and second members.

16 Claims, 17 Drawing Sheets

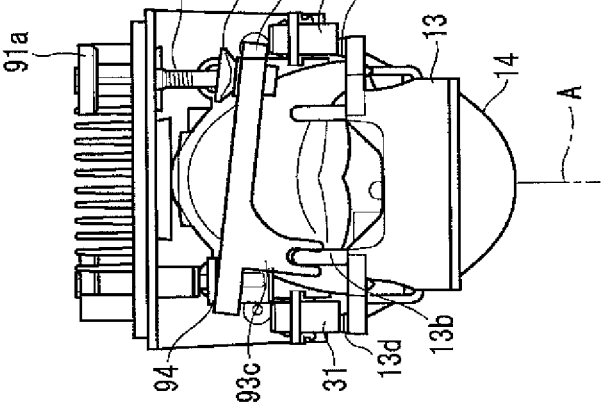
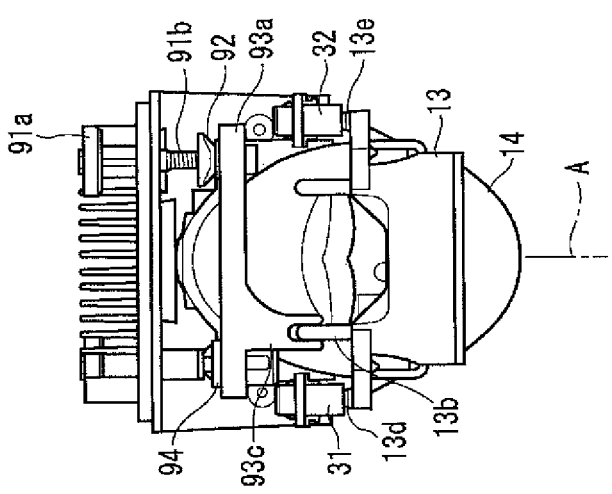
FIG. 7A   FIG. 7B   FIG. 7C

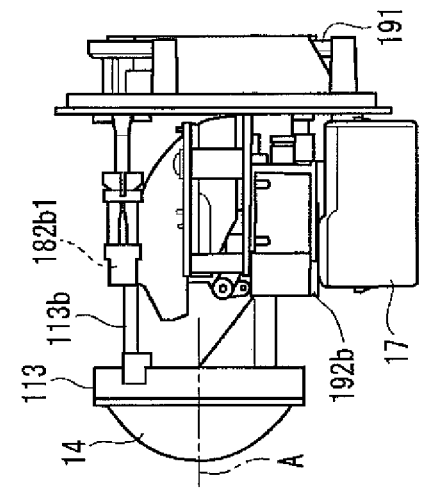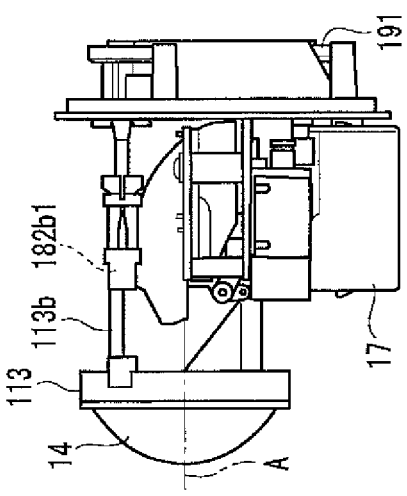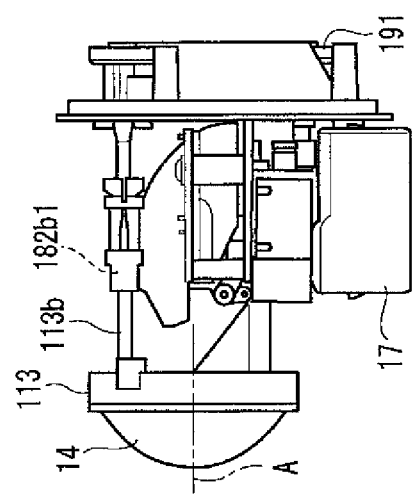

VEHICLE LAMP

CROSS-REFERENCE TO RELATED APPLICATIONS

The present application claims priority from Japanese Patent Application No. 2013-094400 filed on Apr. 26, 2013, the entire content of which is incorporated herein by reference.

BACKGROUND OF INVENTION

1. Field of the Invention

The present invention relates to a vehicle lamp to be mounted on a vehicle.

2. Related Art

When installing a lamp having a projection lens in a housing defining a lamp chamber, an error deviating from a desired specification may occur with respect to a reference position of an optical axis of the projection lens. In order to eliminate this error, a related art lamp has an aiming mechanism.

An aiming mechanism has two screws exposed to the outside of the housing. The reference position of the optical axis is adjustable in a vertical direction of a lamp by rotating one of the screws. The reference position of the optical axis is adjustable in a lateral direction of the lamp by rotating the other screw (see, e.g., JP2012-043656A).

Providing a lamp with such a mechanism for adjusting a reference position of an optical axis causes an increase in the number of parts as well as installation space, which makes it difficult to reduce the size of a lighting apparatus on which the lamp is mounted.

SUMMARY OF INVENTION

One or more embodiments of the present invention provides a lamp having a mechanism configured to adjust a reference position of an optical axis in a space saving manner.

According to one or more embodiments of the present invention, a vehicle lamp is provided. The vehicle lamp includes a light source, a projection lens through which at least a portion of light emitted from the light source passes, and an adjustment mechanism configured to adjust a reference position of an optical axis of the projection lens. The adjustment mechanism includes a first member having a movement axis, a second member holding the first member, a first screw arranged to adjust the reference position in a first direction, and a second screw arranged to adjust the reference position in a second direction intersecting the first direction. The first member is arranged such that the movement axis is positioned on a plane perpendicular to the optical axis and including a focal point of the projection lens. An action by a rotation of the first screw is applied to one of the first member and the second member. An action by a rotation of the second screw is applied to one of the first member and the second member.

According to this configuration, the actions by the rotations of the first screw and the second screw for adjusting the reference position of the optical axis in different directions can be integrated in a mechanism having a common movement axis. In particular, the number of parts and the installation space for the parts can be reduced, as compared with a case where the actions by the rotations of the respective screws are applied to a mechanism having different corresponding movement axes.

The rotation of the first screw may cause one of the first member and the second member to rotate around the movement axis. The rotation of the second screw may cause one of the first member and the second member to move in a direction in which the movement axis extends.

Since the movement axis is positioned on a plane perpendicular to the optical axis and including the focal point of the projection lens, the relative position of the focal point and the light source is not changed. Therefore, an operation of adjusting the reference position of the optical axis does not affect the light distribution by the lamp.

The action by the rotation of the first screw and the action by the rotation of the second screw may both be applied to one of the first member and the second member. With this configuration, the structure of the adjustment mechanism can be further simplified.

The vehicle lamp may further include a holder holding the projection lens, and the first member may be provided as a portion of the holder. With this configuration, it is possible to improve easy molding of the holder. Particularly, in combination with the configuration in which the action by the rotation of the first screw and the action by the rotation of the second screw are both applied to the first member, the effect becomes more significant.

The first direction may correspond to a vertical direction of a vehicle on which the lamp is mounted. With this configuration, it is possible to reduce the dimension in the vertical direction, in a case where layout constraints for arranging the lamp in the lighting apparatus are relatively strict.

The vehicle lamp may further include an actuator having a drive shaft to displace the optical axis in the first direction, and the first screw and the drive shaft may be arranged in a parallel manner along the direction in which they extend. With this configuration, the shaft portion of the first screw and the drive shaft of the actuator can be arranged as close as possible, and the adjustment of the reference position of the optical axis of the projection lens and the adjustment of the direction of the optical axis by the actuator can be performed substantially on the same axis. Accordingly, it is possible to reduce the size of the lamp, as compared with a configuration where these adjustments are performed on different axes.

The vehicle lamp may further include a movable shade to change a shape of a light distribution pattern to be formed by the light emitted from the light source. With this configuration, the optical axis of the optical system capable of forming a plurality of light distribution patterns can be adjusted by only a pair of screws. This is because there is only one optical axis to be adjusted.

The vehicle lamp may further include a heat sink to which the light source is fixed, and the first screw and the second screw may be arranged to extend through the heat sink. With this configuration, it is possible to further reduce the installation space of the lamp, and also to facilitate mounting of the lamp to the lighting apparatus.

BRIEF DESCRIPTION OF DRAWINGS

FIGS. 7A to 7C are plan views illustrating the movement of each part by an operation of a second screw of the lamp unit;

FIGS. 14A to 14C are left side views illustrating the movement of each part by an operation of a second screw of the lamp unit shown in FIG. 11;

DETAILED DESCRIPTION

Hereinafter, illustrative embodiments of the present invention will be described in detail with reference to the accompanying drawings. The scale of drawings is changed where appropriate to better illustrate each part. In the following description, the terms "left" and "right" correspond to the left and right as seen from a driver's seat.

Figure 1:
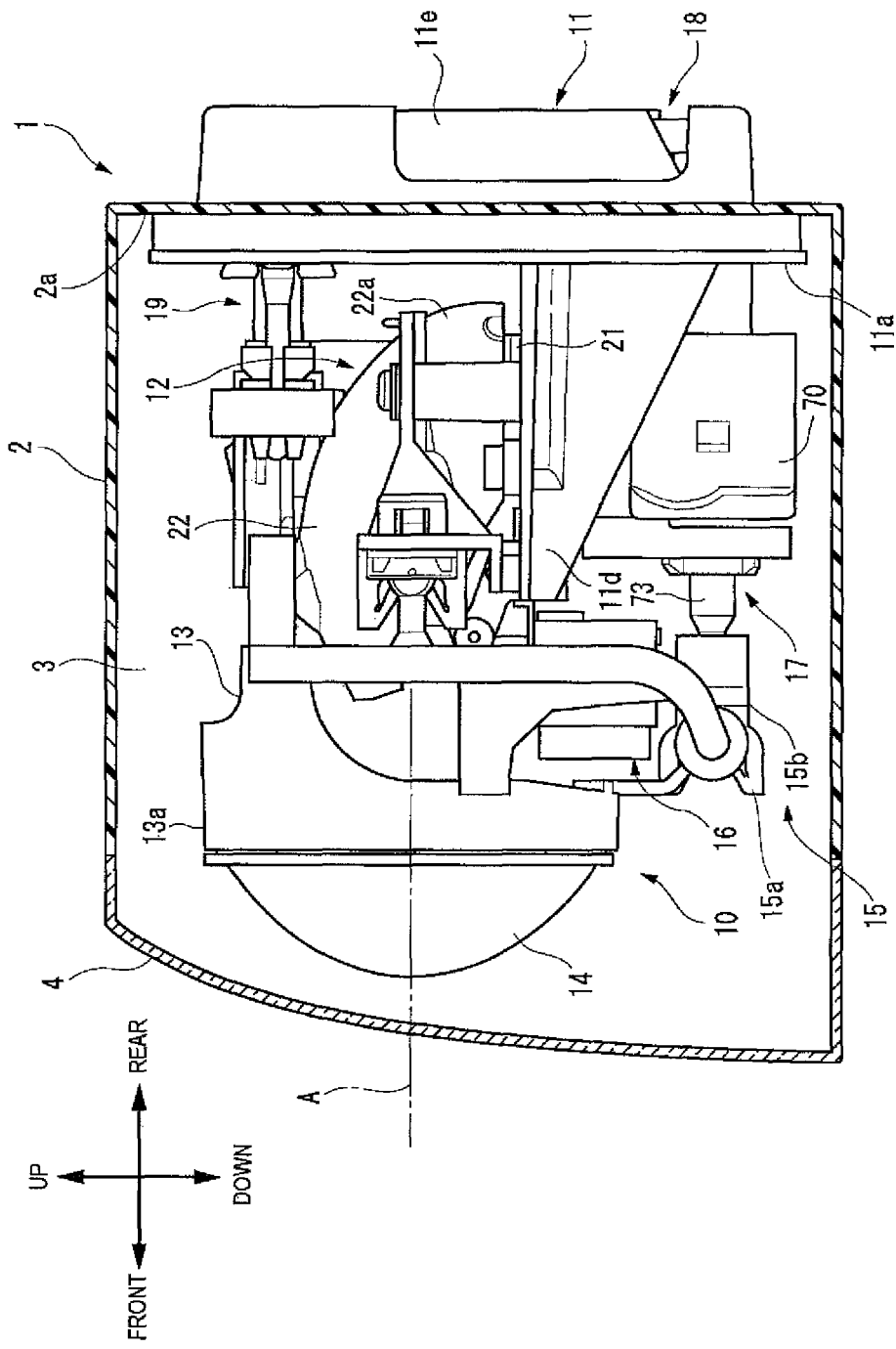
FIG. 1 is a left side view of a lighting apparatus according to one or more embodiments of the present invention, partially showing a cross section thereof.

FIG. 1 is a left side view of a portion of a headlamp apparatus 1, in a state of being cut in a vertical plane. The headlamp apparatus 1 is mounted on a front portion of a vehicle to irradiate a region in front of the vehicle. The headlamp apparatus 1 includes a housing 2 and a transparent cover 4 attached to the housing 2 to form a lamp chamber 3 together with the housing 2. A lamp unit 10 (as an example of a lamp) according to one or more embodiments of the present invention is disposed in the lamp chamber 3.

The lamp unit 10 includes a heat sink 11, a light source unit 12, a lens holder 13, a projection lens 14, a joint 15, a light distribution control unit 16, an actuator 17, a first aiming mechanism 18 and a second aiming mechanism 19.

The heat sink 11 includes a back plate 11a extending in the vertical and lateral direction. A support portion 11d extends forward on the front side of the back plate 11a. A plurality of heat-dissipating fins 11e is formed on the back side of the back plate 11a. Each heat-dissipating fin 11e extends in the vertical direction.

The lamp unit 10 is installed in the housing 2 from the inside of the lamp chamber 3. The back plate 11a of the heat sink 11 is opposed to a back wall 2a of the housing 2. An opening (not shown) is formed in the back wall 2a. The portion of the heat sink 11 where the heat-dissipating fins 11e are formed is inserted through the opening and exposed to the outside of the back wall 2a.

The light source unit 12 includes a light source 21 and a reflector 22. The light source 21 and the reflector 22 are fixed to the support portion 11d of the heat sink 11. A dome-shaped inner surface 22a of the reflector 22 serves as a reflecting surface and is positioned so as to face the light source 21.

The lens holder 13 is disposed in front of the reflector 22. The lens holder 13 includes a lens holding part 13a. The lens holding part 13a is an annular frame and the projection lens 14 is fixed to a front surface of the lens holding part.

The projection lens 14 is a plano-convex aspherical lens having a convex light exiting surface and a flat light entering surface. Light emitted from the light source 21 is reflected forward by the inner surface 22a of the reflector 22 and at least a portion of the reflected light passes through the projection lens 14. The light that has passed through the projection lens 14 illuminates the front through the transparent cover 4.

In the rear of the lens holder 13, the actuator 17 is disposed below the support portion 11d of the heat sink 11. The actuator 17 includes a case 70 and a shaft 73. A drive circuit is provided in the case 70 and receives a control signal from a control unit (not shown) that is provided on the outside of the lamp unit 10. The shaft 73 is movable toward and away from the case 70 in accordance with the control signal. The actuator 17 is disposed such that a distal end of the shaft 73 faces forward.

The joint 15 includes a front engaging portion 15a and a rear engaging portion 15b. The front engaging portion 15a is engaged with the lower portion of the lens holder 13 and the rear engaging portion 15b is engaged with the distal end of the shaft 73. The lens holder 13 and the actuator 17 are connected to each other through the joint 15.

Figure 2:
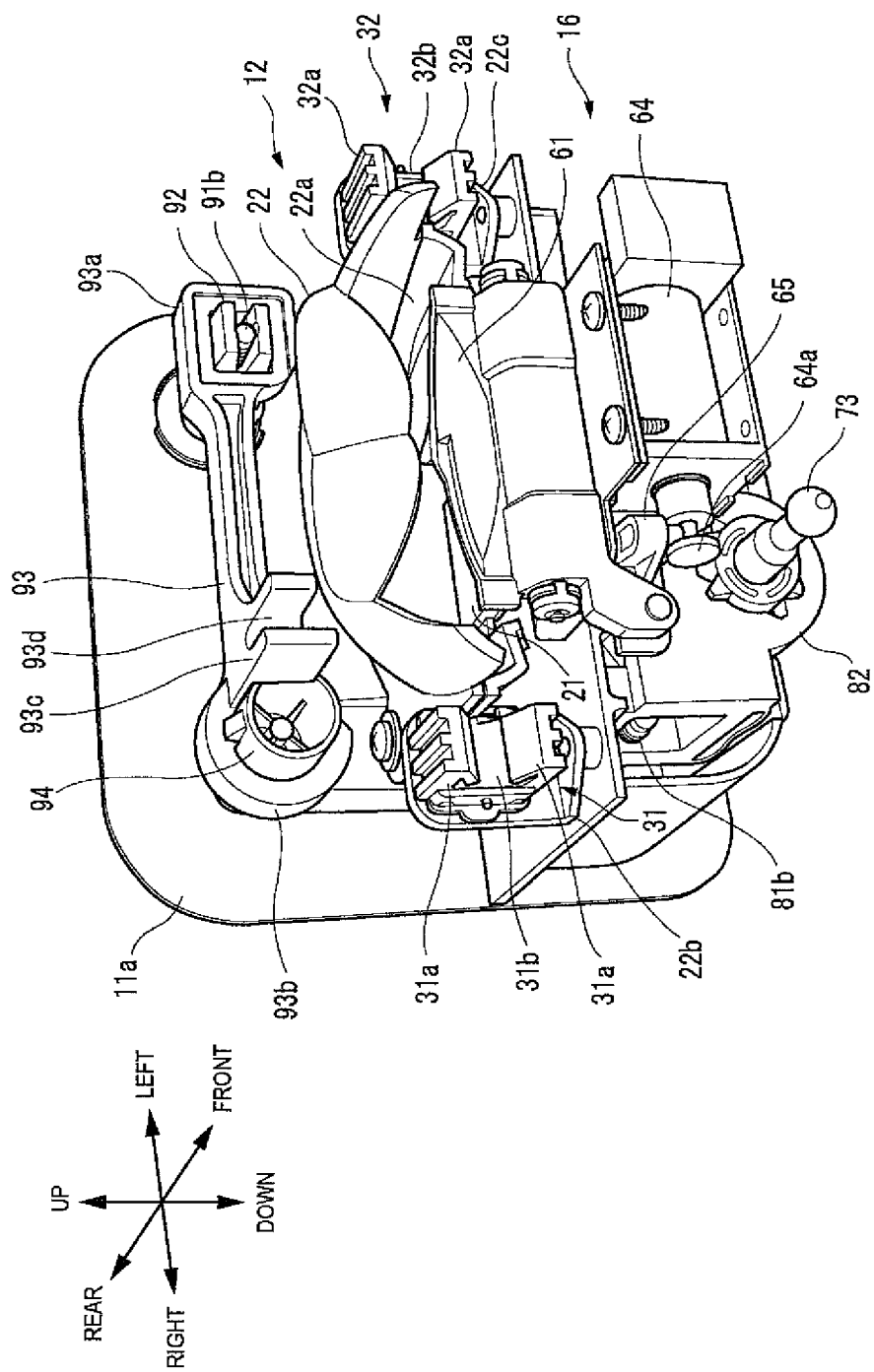
FIG. 2 is a perspective view of a portion of a lamp unit shown in FIG. 1.
Figure 3:
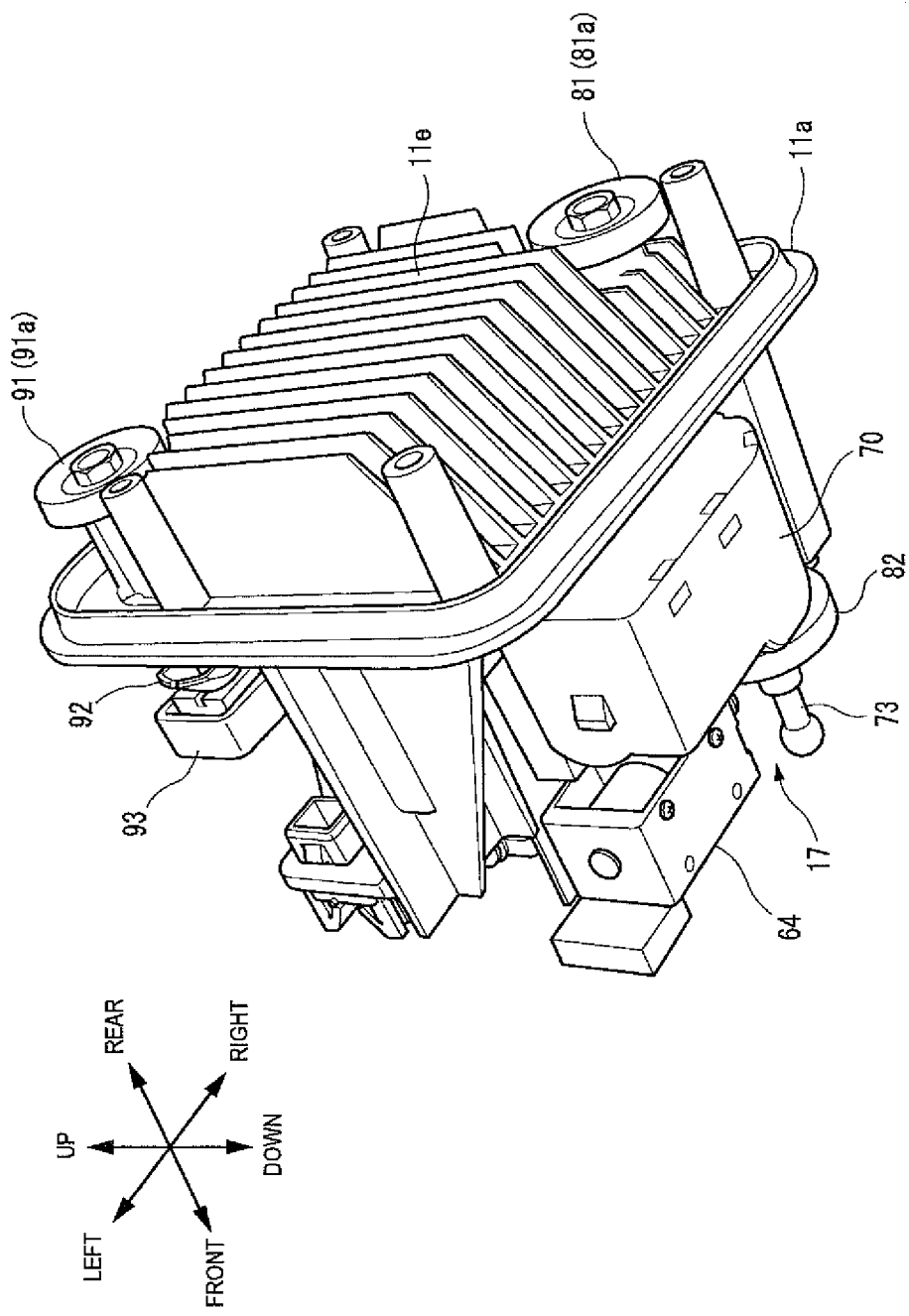
FIG. 3 is another perspective view of the portion of the lamp unit.

FIG. 2 is an upper front perspective view of the lamp unit 10 from which the lens holder 13, the projection lens 14 and the joint 15 are removed. FIG. 3 is a lower rear perspective view of the lamp unit 10 from which the lens holder 13, the projection lens 14 and the joint 15 are removed. The light distribution control unit 16 is disposed in front of the light source unit 21 and includes a movable shade 61 and a solenoid 64.

The movable shade 61 is disposed slightly forward of a rear focal point of the projection lens 14. Accordingly, a portion of the light that is emitted from the light source 21 and reflected by the inner surface 22a of the reflector 22 is blocked by the movable shade 61. As the shape of the upper end edge of the movable shade 61 is inversely projected forward, a low-beam light distribution pattern is formed on the front of the vehicle. The low-beam light distribution pattern has a cut-off line corresponding to the shape of the upper end edge and a lower portion thereof serves as an illumination area.

A plunger 64a is included in the solenoid 64 and connected to the movable shade 61 via a link mechanism 65. As power is supplied to a coil included in the solenoid 64 and the plunger 64a is operated, the movable shade 61 is tilted rearward via the link mechanism 65.

In this way, the upper end edge of the movable shade 61 is retracted below the optical axis A (see FIG. 1) of the projection lens 14 and the shielding state of the light emitted from the light source 21 is eliminated. The light that is emitted from the light source 21 and reflected by the reflector 22 passes through the projection lens 14 to form a high-beam light distribution pattern which illuminates the far and wide range of the front of the vehicle.

The first aiming mechanism 18 includes a first screw 81 and a joint 82. The first screw 81 includes a head portion 81a and a shaft portion 81b. As shown in FIG. 3, the head portion 81a is disposed on the rear side of the lower right portion of the back plate 11a of the heat sink 11. As shown in FIG. 2, the shaft portion 81b penetrates the back plate 11a of the heat sink 11 and extends forward. A screw groove is formed on the outer peripheral surface of the shaft portion 81b.

The joint 82 has an insertion hole which is formed, at an inner peripheral surface, with a screw groove. As shown in FIG. 2, the shaft portion 81b of the first screw 81 is inserted through the insertion hole formed on the joint 82 and then the screw groove of the shaft portion 81b and the screw groove of the joint 82 are screwed each other. As shown in FIG. 2 and FIG. 3, the joint 82 is coupled with a portion of the case 70 of the actuator 17.

When the head portion 81a of the first screw 81 is rotationally operated by a jig (not shown), the screwed position of the shaft portion 81b and the joint 82 is changed and the joint 82 is displaced in the longitudinal direction. Since the joint 82 is coupled with the case 70 of the actuator 17, the actuator 17 is also displaced in the longitudinal direction in accordance with the rotation of the first screw 81.

The second aiming mechanism 19 includes a second screw 91, a joint 92, a link 93 and a pivot member 94. The second screw 91 includes a head portion 91a and a shaft portion 91b.

As shown in FIG. 3, the head portion 91a is disposed on the rear side of the upper left portion of the back plate 11a of the heat sink 11. As shown in FIG. 2, the shaft portion 91b penetrates the back plate 11a of the heat sink 11 and extends forward. A screw groove is formed on the outer peripheral surface of the shaft portion 91b. The joint 92 is configured by a pair of clamping pieces which is respectively formed, on the opposing surfaces, with a screw groove. By clamping the shaft portion 91b of the second screw 91 from the vertical direction by the pair of clamping pieces, the screw grooves of the clamping pieces and the screw groove of the shaft portion 91b are screwed to each other.

As shown in FIG. 2, a first end 93a of the link 93 is connected to the joint 92 and a second end 93b thereof is connected to the pivot member 94. The pivot member 94 is provided on the upper right portion of the back plate 11a of the heat sink 11. The link 93 includes an arm portion 93c extending forward from a position adjacent to the second end 93b. A fitting groove 93d is formed at the distal end of the arm portion 93c.

A mounting piece 22b is formed on the right side of the reflector 22 and a right bearing 31 is mounted on the mounting piece 22b. The right bearing 31 includes a pair of clamping pieces 31a which is arranged to be parallel in the vertical direction. A fitting groove 31b is formed between the pair of clamping pieces 31a and extends in the lateral direction. A mounting piece 22c is formed on the left side of the reflector 22 and a left bearing 32 is mounted on the mounting piece 22c. The left bearing 32 includes a pair of clamping pieces 32a which is arranged to be parallel in the vertical direction. A fitting groove 32b is formed between the pair of clamping pieces 32a and extends in the lateral direction.

Figure 4:
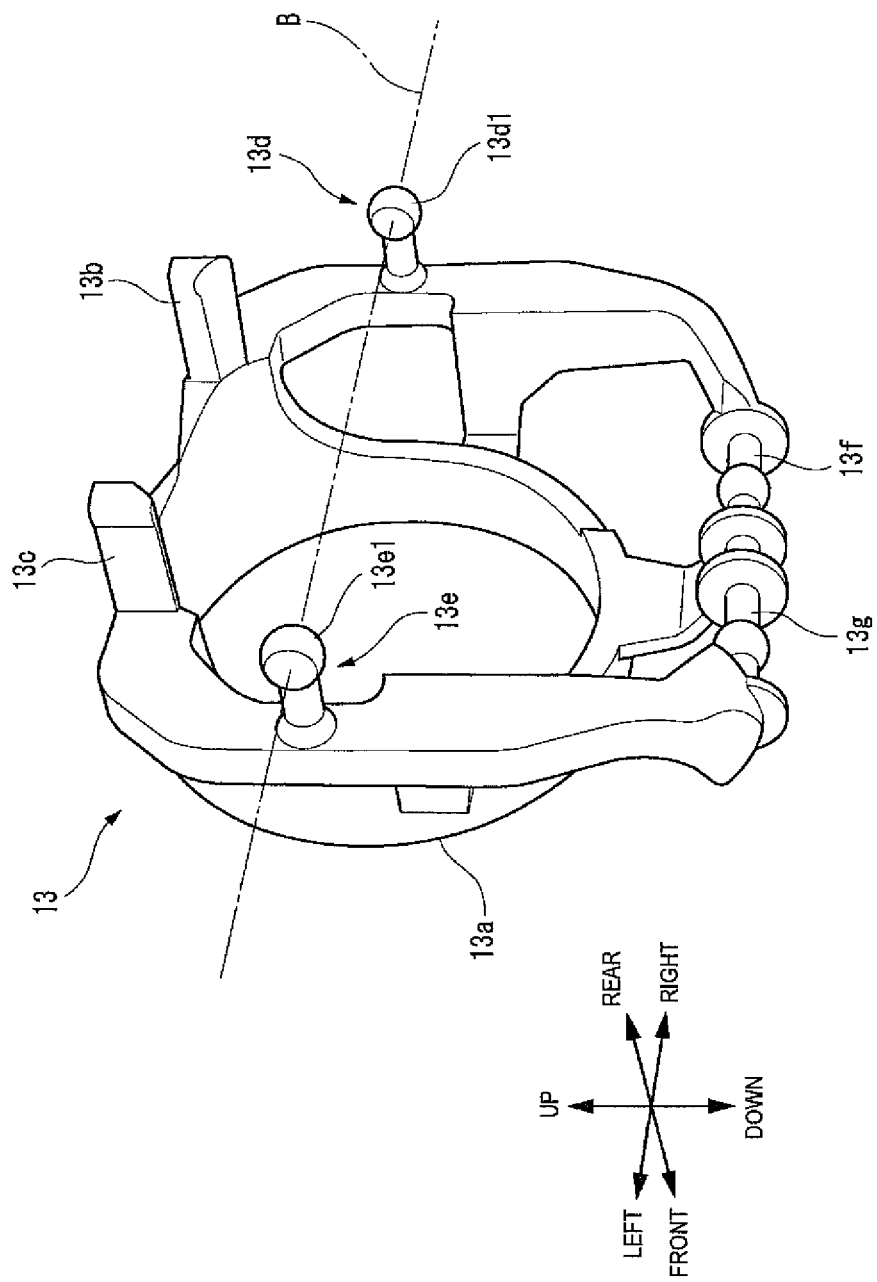
FIG. 4 is a perspective view of a lens holder of the lamp unit.

FIG. 4 is a lower rear perspective view of the lens holder 13. The lens holder 13 includes a right arm portion 13b, a left arm portion 13c, a right shaft portion 13d, a left shaft portion 13e, a right pivot shaft 13f and a left pivot shaft 13g.

The right arm portion 13b extends rearward from the right side portion of the upper rear surface of the lens holder 13. The left arm portion 13c extends rearward from the left side portion of the upper rear surface of the lens holder 13. The right shaft portion 13d extends rearward from the lower side of the right arm portion 13b on the rear surface of the lens holder 13. The left shaft portion 13e extends rearward from the lower side of the left arm portion 13c on the rear surface of the lens holder 13. The right pivot shaft 13f is provided at the right side portion of the lower portion of the lens holder 13. The left pivot shaft 13g is provided at the left side portion of the lower portion of the lens holder 13.

A distal end portion 13d1 of the right shaft portion 13d and a distal end portion 13e1 of the left shaft portion 13e have a substantially spherical shape, respectively. The distal end portions 13d1, 13e1 are arranged such that a movement axis B connecting both distal end portions 13d1, 13e1 is perpendicular to the optical axis A of the projection lens 14 mounted on the lens holding part 13a and passes through a rear focal point of the projection lens 14. In other words, the movement axis B is positioned on a plane perpendicular to the optical axis A and including the rear focal point of the projection lens 14.

Figure 5:
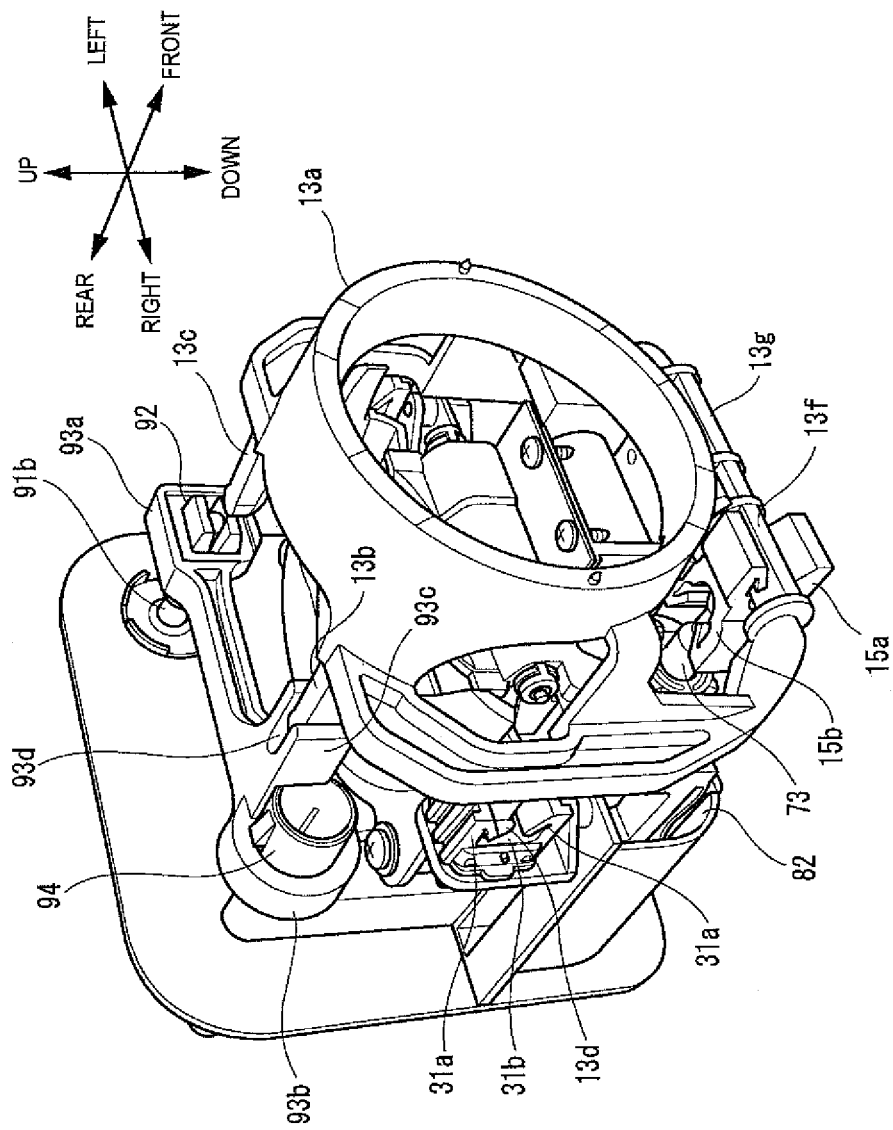
FIG. 5 is a perspective view of a portion of the lamp unit.

FIG. 5 is an upper front perspective view of a portion of the lamp unit with the lens holder 13 from which the projection lens 14 is removed.

The right arm portion 13b of the lens holder 13 is fitted into the fitting groove 93d of the link 93. The right arm portion 13b is held by the arm portion 93e of the link 93 while being allowed to displace vertically in the fitting groove 93d. The left arm portion 13c is used when the lens holder 13 is mounted on the lamp unit having a bilaterally symmetric structure. In the present embodiment, the left arm portion 13c is not fitted with the other members.

The right shaft portion 13d of the lens holder 13 is fitted with the right bearing 31. Specifically, the distal end portion 13d1 is fitted into the fitting groove 31b and clamped by the pair of clamping pieces 31a. In the fitting groove 31b, the distal end portion 13d1 is allowed to rotate about the movement axis B (see FIG. 4) and to move in the lateral direction.

The left shaft portion 13e of the lens holder 13 is fitted with the left bearing 32. Specifically, the distal end portion 13e1 is fitted into the fitting groove 32b and clamped by the pair of clamping pieces 32a. In the fitting groove 32b, the distal end portion 13e1 is allowed to rotate about the movement axis B (see FIG. 4) and to move in the lateral direction.

The front connecting portion 15a of the joint 15 includes a pair of clamping pieces that is arranged to be parallel in the longitudinal direction. A fitting groove is formed between the pair of clamping pieces. The right pivot shaft 13f of the lens holder 13 is fitted into the fitting groove of the front connecting portion 15a. The right pivot shaft 13f is clamped by the pair of clamping pieces so as to be rotatable in the fitting groove. The left pivot shaft 13g is used when the lens holder 13 is mounted on the lamp unit having a bilaterally symmetric structure. In the present embodiment, the left pivot shaft 13g is not fitted with the other members.

Figure 6A:
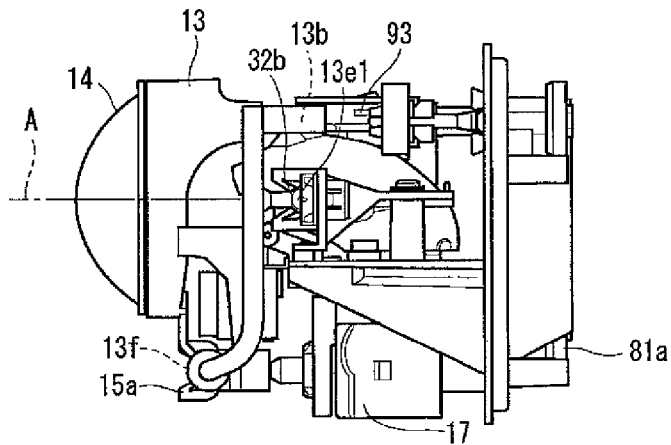
FIGS. 6A to 6C are left side views illustrating the movement of each part by an operation of a first screw of the lamp unit.
Figure 6B:
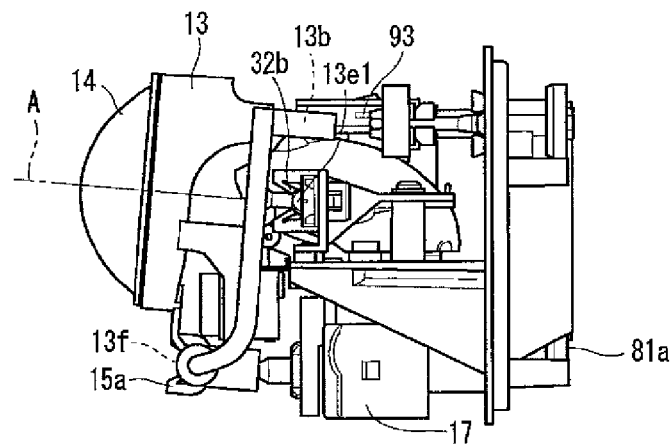
Figure 6C:
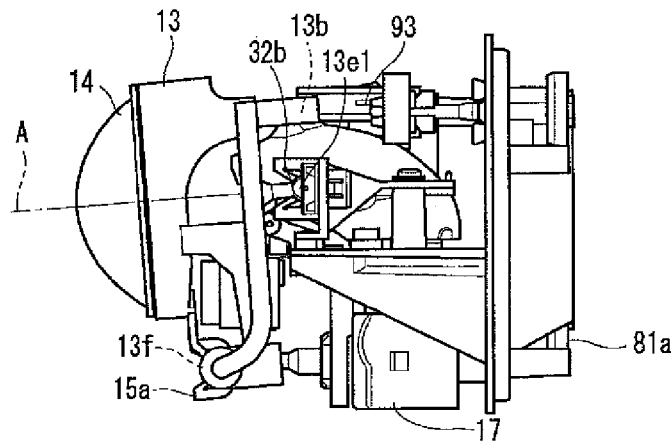

FIGS. 6A to 6C are left side views for explaining the movement of each part of the lamp unit 10 by the rotation of the first screw 81. FIG. 6A illustrates an initial state.

When the first screw 81 is rotated to the left from the initial state, the actuator 17 is pushed forward. As a result, the lower portion of the lens holder 13 is pushed forward via the joint 15. At this time, each of the distal end portions 13d1, 13e1 of the right shaft portion 13d and the left shaft portion 13e is rotated upward in the fitting grooves 31b, 32b of the right bearing 31 and the left bearing 32, respectively. As a result, the right pivot shaft 13f is rotated upward in the fitting groove included in the front connecting portion 15a of the joint 15 and the right arm portion 13b is rotated upward in the fitting groove 93d of the link 93. Accordingly, as shown in FIG. 6B, the optical axis A of the projection lens 14 is tilted upward.

On the other hand, when the first screw 81 is rotated to the right, the actuator 17 is pulled rearward. As a result, the lower portion of the lens holder 13 is pulled rearward via the joint 15. At this time, each of the distal end portions 13d1, 13e1 of the right shaft portion 13d and the left shaft portion 13e is rotated downward in the fitting grooves 31b, 32b of the right bearing 31 and the left bearing 32, respectively. As a result, the right pivot shaft 13f is rotated downward in the fitting groove included in the front connecting portion 15a of the joint 15 and the right arm portion 13b is rotated downward in the fitting groove 93d of the link 93. Accordingly, as shown in FIG. 6C, the optical axis A of the projection lens 14 is tilted downward.

Specifically, with the operation of the head portion 81a of the first screw 81, the reference position of the actuator 17, i.e., the reference position of the optical axis A of the projection lens 14 in the vertical direction is adjusted.

FIGS. 7A to 7C are plan views for explaining the movement of each part of the lamp unit 10 by the rotation of the second screw 91. FIG. 7A illustrates an initial state.

When the second screw 91 is rotated to the left from the initial state, the first end 93a of the link 93 is pushed forward via the joint 92. As a result, the right arm portion 13b of the lens holder 13 is pushed to the right via the arm portion 93c of the link 93. At this time, each of the distal end portions 13d1, 13e1 of the right shaft portion 13d and the left shaft portion 13e is moved to the right in the fitting grooves 31b, 32b of the right bearing 31 and the left bearing 32, respectively. Accordingly, as shown in FIG. 7B, the optical axis A of the projection lens 14 is translated to the right.

On the other hand, when the second screw 91 is rotated to the right, the first end 93a of the link 93 is pulled rearward via the joint 92. As a result, the right arm portion 13b of the lens holder 13 is pushed to the left via the arm portion 93c of the link 93. At this time, each of the distal end portions 13d1, 13e1 of the right shaft portion 13d and the left shaft portion 13e is moved to the left in the fitting grooves 31b, 32b of the right bearing 31 and the left bearing 32, respectively. Accordingly, as shown in FIG. 7C, the optical axis A of the projection lens 14 is translated to the left.

Specifically, with the operation of the head portion 91a of the second screw 91, the reference position of the optical axis A of the projection lens 14 in the lateral direction is adjusted.

Figure 8A:
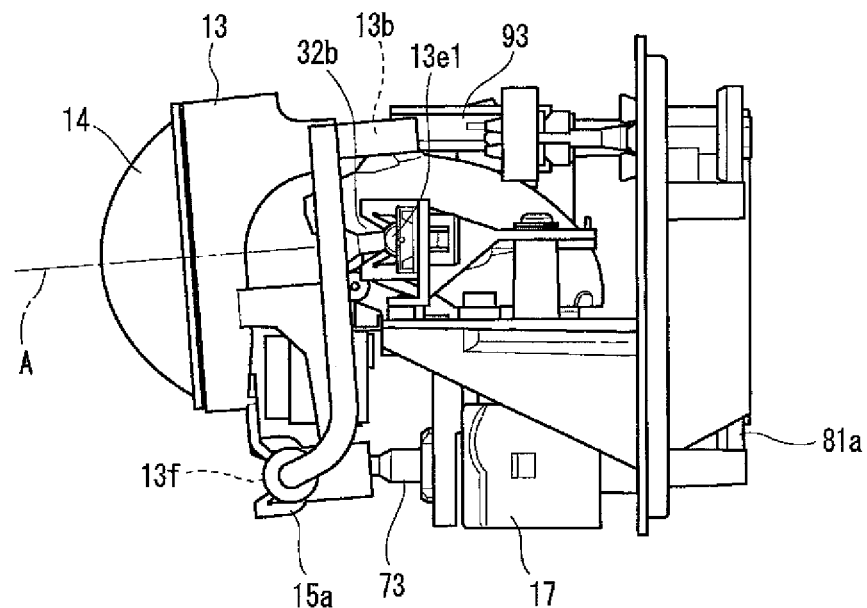
FIGS. 8A and 8B are left side views illustrating the movement of each part by an operation of an actuator of the lamp unit.
Figure 8B:
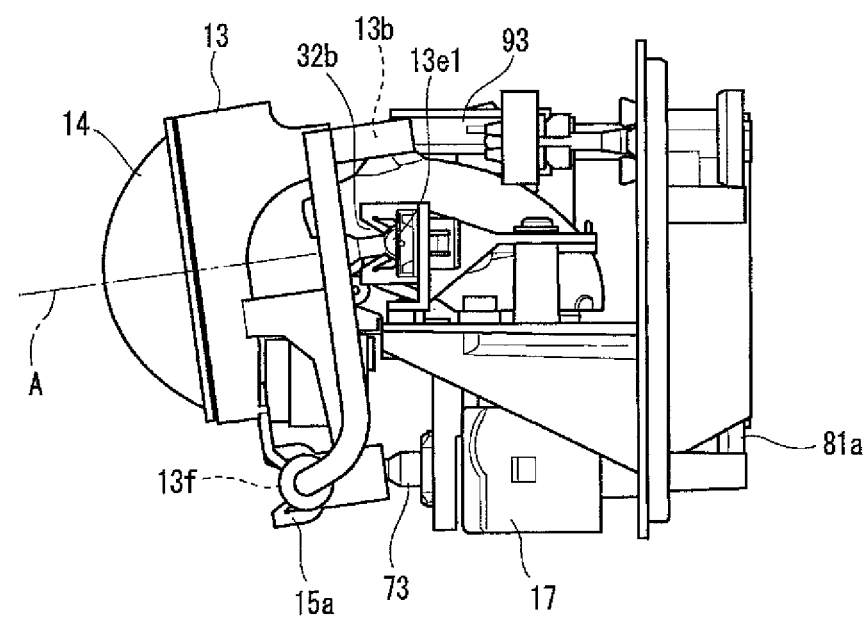

The actuator 17 is a mechanism for changing the direction of the optical axis A of the projection lens 14 into the vertical direction of a vehicle, depending on the change in the vehicle height due to the number of passengers or the loading of baggage. FIG. 8A shows a state (the same state as FIG. 6C) where the optical axis A of the projection lens 14 is somewhat tilted downward by the operation of the first screw 81. FIG. 8B shows a state where the actuator 17 is operated from the state shown in FIG. 8A and the shaft 73 is retracted rearward.

The retraction of the shaft 73 causes the lower portion of the lens holder 13 to be further pulled rearward via the joint 15. At this time, each of the distal end portions 13d1, 13e1 of the right shaft portion 13d and the left shaft portion 13e is further rotated downward in the fitting grooves 31b, 32b of the right bearing 31 and the left bearing 32, respectively. As a result, the right pivot shaft 13f is further rotated downward in the fitting groove included in the front connecting portion 15a of the joint 15 and the right arm portion 13b is further rotated downward in the fitting groove 93d of the link 93. Accordingly, the optical axis A of the projection lens 14 is further tilted downward.

Specifically, by further advancing and retracting the shaft 73 of the actuator 17 with reference to the position of the optical axis A of the projection lens 14 that is adjusted by the operation of the first screw 81 and the second screw 91, the optical axis A can be displaced in the vertical direction.

Figure 9:
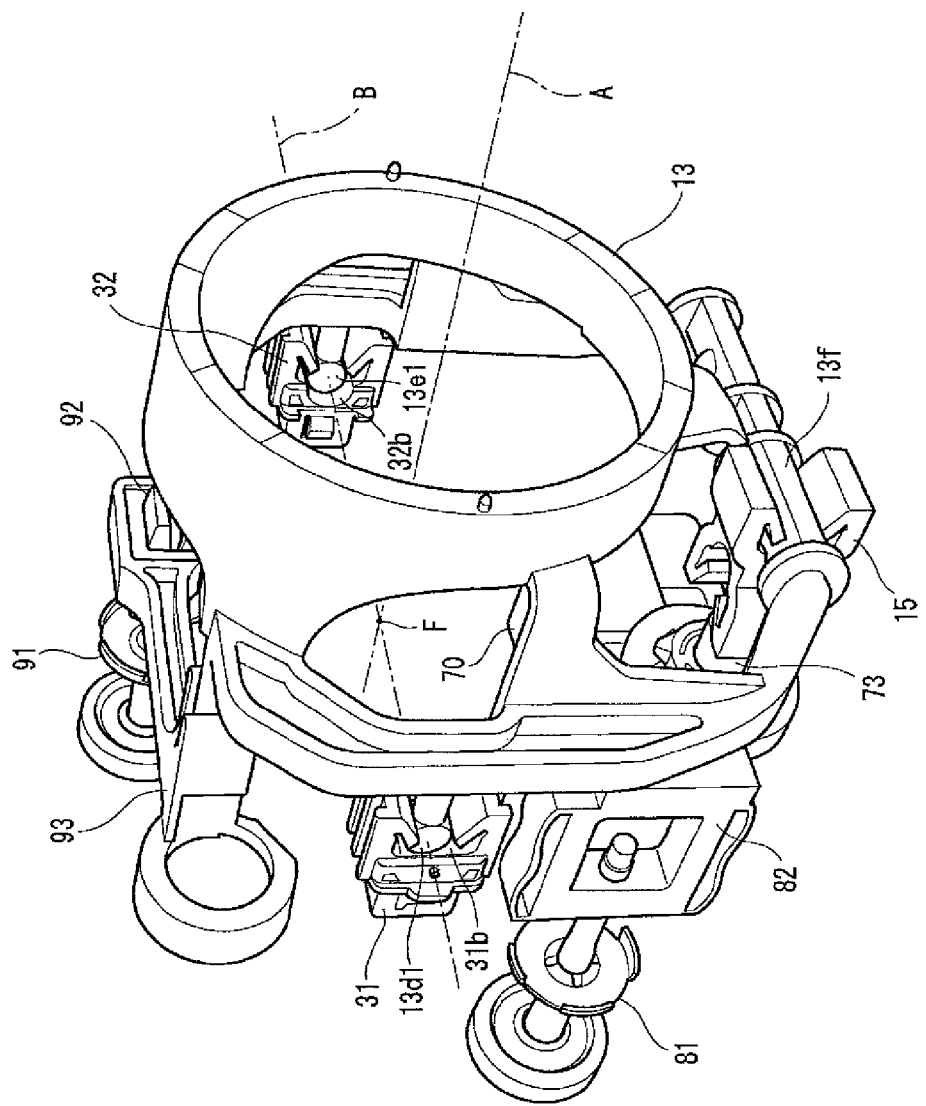
FIG. 9 is a perspective view of parts forming a mechanism for adjusting a reference position of an optical axis of a projection lens of the lamp unit.

FIG. 9 is a perspective view parts forming an adjustment mechanism for adjusting the reference position of the optical axis A of the lamp unit 10.

The distal end portion 13d1 of the right shaft portion 13d and the distal end portion 13e1 of the left shaft portion 13e of the lens holder 13, respectively, have the movement axis B (an example of the first member). The right bearing 31 and the left bearing 32, respectively, hold the distal end portions 13d1, 13e1 (an example of the second member). The distal end portions 13d1, 13e1 are arranged such that the movement axis B is positioned on a plane perpendicular to the optical axis A of the projection lens 14 and including rear focal point F of the projection lens 14.

The rotation of the first screw 81 is converted into the back and forth movement of the joint 82 coupled to the actuator 17, thereby causing the lens holder 13 to rotate in the vertical direction via the joint 15. In other words, the action by the rotation of the first screw 81 is applied to the distal end portions 13d1, 13e1, and the distal end portions 13d1, 13e1 are rotated about the movement axis B in the fitting grooves 31b, 32b of the right bearing 31 and the left bearing 32. As a result, the reference position in the vertical direction (an example of the first direction) of the optical axis A is adjusted.

The rotation of the second screw 91 is converted into the back and forth movement of the joint 92, thereby causing the lens holder 13 to move in the lateral direction via the link 93. In other words, the action by the rotation of the second screw 91 is applied to the distal end portions 13d1, 13e1 to cause the distal end portions 13d1, 13e1 to move in the direction in which the movement axis B extends in the fitting grooves 31b, 32b of the right bearing 31 and the left bearing 32. As a result, the reference position in the lateral direction (an example of the second direction) of the optical axis A is adjusted.

According to the above configuration, the actions by the rotations of the first screw 81 and the second screw 91 for adjusting the reference position of the optical axis A in different directions intersecting each other can be integrated into a mechanism having a common movement axis B. In particular, the number of parts and the installation space for the parts can be reduced, as compared to a case where the actions by the rotations of the respective screws are applied to a mechanism having different corresponding axes.

The distal end portions 13d1, 13e1 are rotated about the movement axis B by the rotation of the first screw 81 and moved in the direction in which the movement axis B extends by the rotation of the second screw 91. Here, the movement axis B is positioned on a plane perpendicular to the optical axis A and including the rear focal point F of the projection lens 14. Accordingly, the relative position of the rear focal point F and the light source 21 is not changed. As a result, an operation of adjusting the reference position of the optical axis A does not affect the light distribution by the lamp unit 10.

The actions by the rotations of the first screw 81 and the second screw 91 are both applied to the distal end portions 13d1, 13e1. Accordingly, it is possible to further simplify the structure of the adjustment mechanism.

The right shaft portion 13d and the left shaft portion 13e, which have the movement axis B, are formed as a portion of the lens holder 13. Contrary to this configuration, a member having the movement axis B may be provided on the side of the reflector 22 and a member serving as a bearing may be provided on the side of the lens holder 13. However, the configuration of the present embodiment is advantageous in that the lens holder 13 can be easily molded.

The first screw 81 for rotating the distal end portions 13d1, 13e1 is for adjusting the position of the optical axis A in the vertical direction and the second screw 91 for sliding the distal end portions 13d1, 13e1 is for adjusting the position of the optical axis A in the lateral direction. Contrary to this configuration, the position of the optical axis A may be adjusted in the vertical direction by the sliding of the distal end portions 13d1, 13e1 and the position of the optical axis A may be adjusted in the lateral direction by the rotation of the distal end portions 13d1, 13e1. However, the configuration of the present embodiment is desirable since it is possible to reduce the dimension in the vertical direction, which has relatively high layout constraints when being mounted on the headlamp apparatus 1.

The lamp unit 10 includes the actuator 17 which has the shaft 73 (an example of the drive shaft) for displacing vertically the optical axis A of the projection lens 14. The first screw 81 and the shaft 73 are arranged in a parallel manner along the direction in which they extend. According to this configuration, the shaft portion 81b of the first screw 81 and the shaft 73 of the actuator 17 can be placed as close as possible and therefore the adjustment of the reference position of the optical axis A of the projection lens 14 and the adjustment of the direction of the optical axis A by the actuator 17 can be performed substantially on the same axis. Accordingly, it is possible to reduce the size of the lamp unit 10, as compared to a configuration in which these adjustments are performed on different axes.

The lamp unit 10 includes the movable shade 61 for changing the shape of a light distribution pattern that is formed by the light emitted from the light source 21. In this case, the adjustment of the optical axis of an optical system that is capable of forming a plurality of light distribution patterns can be performed only by a pair of screws 81, 91. The reason is that the optical axis to be adjusted is only one.

The first screw 81 and the second screw 91 are arranged to extend through the portion of the heat sink 11 on which the heat-dissipating fins 11e are formed. Accordingly, it is possible not only to further reduce the installation space of the lamp unit 10 but also to improve the mounting operability to the headlamp apparatus 1. The reason is that, as shown in FIG. 1, the mounting of the lamp unit 10 to the housing 2 is completed just by inserting the portion having the heat-dissipating fins 11e formed thereon through an opening formed on the back wall 2a of the housing 2 from the inside of the lamp chamber 3.

Figure 10:
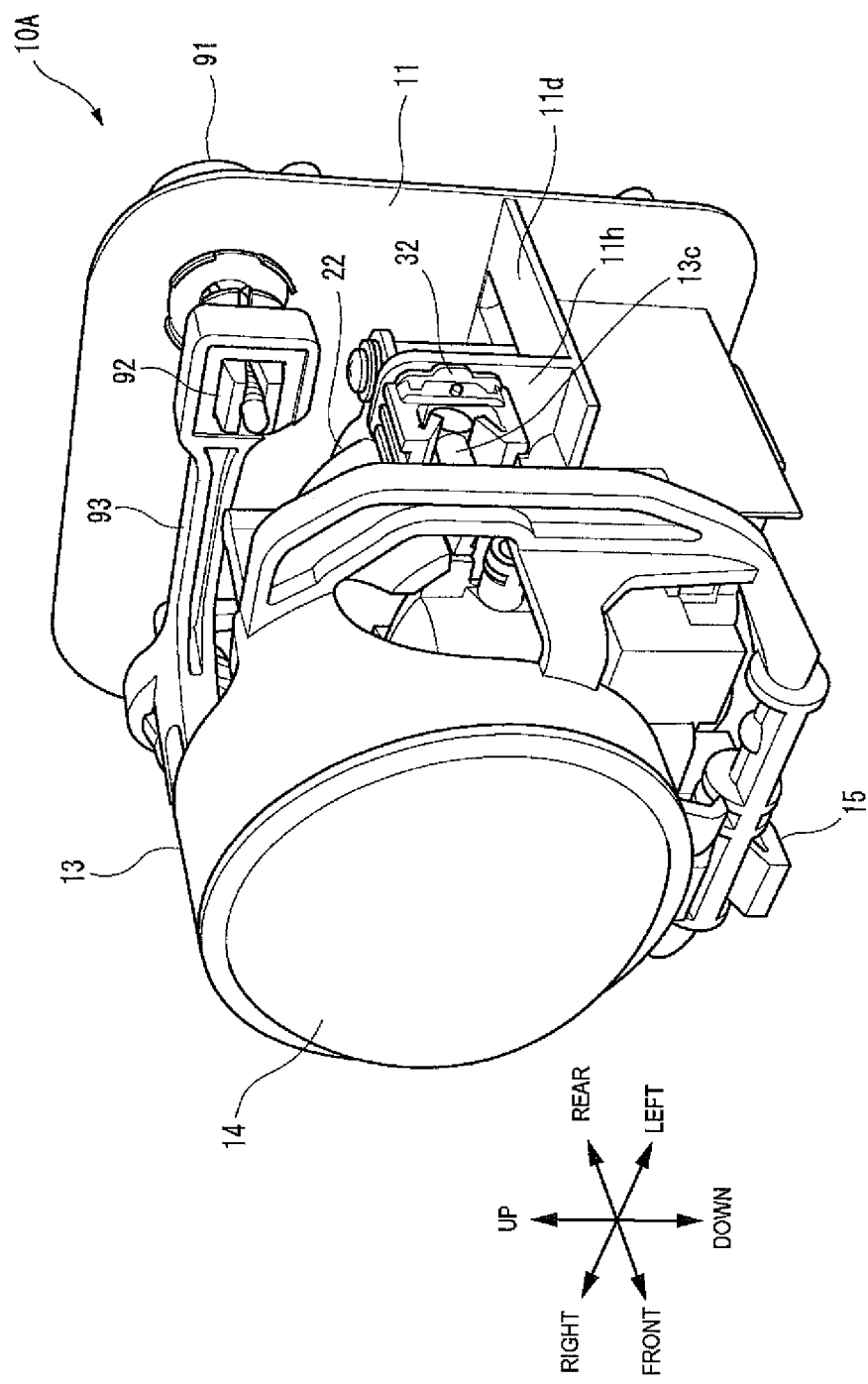
FIG. 10 is a perspective view illustrating a modification of the lamp unit.

The right bearing 31 and the left bearing 32 may not be mounted on the mounting pieces 22b, 22c formed on both lateral sides of the reflector 22. As in a lamp unit 10A according to a modification shown in FIG. 10, an arm portion 11h may extend upward from the support portion 11d of the heat sink 11 and the left bearing 32 may be mounted on a distal end of the arm portion 11h. Although not shown, also in the right side of the reflector 22, the arm portion 11h having a bilaterally symmetric structure extends upward from the support portion 11d and the right bearing 31 is mounted on a distal end of the arm portion 11h. Accordingly, the mounting pieces 22b, 22c are not provided on both lateral sides of the reflector 22.

Next, a lamp unit 110 according to one or more embodiments of the present invention will be described with reference to FIG. 11 to FIG. 18. The same or similar component will be denoted by the same reference numeral as that of the embodiment shown in FIG. 1 and the repetitive explanation thereof will be omitted.

Figure 11:
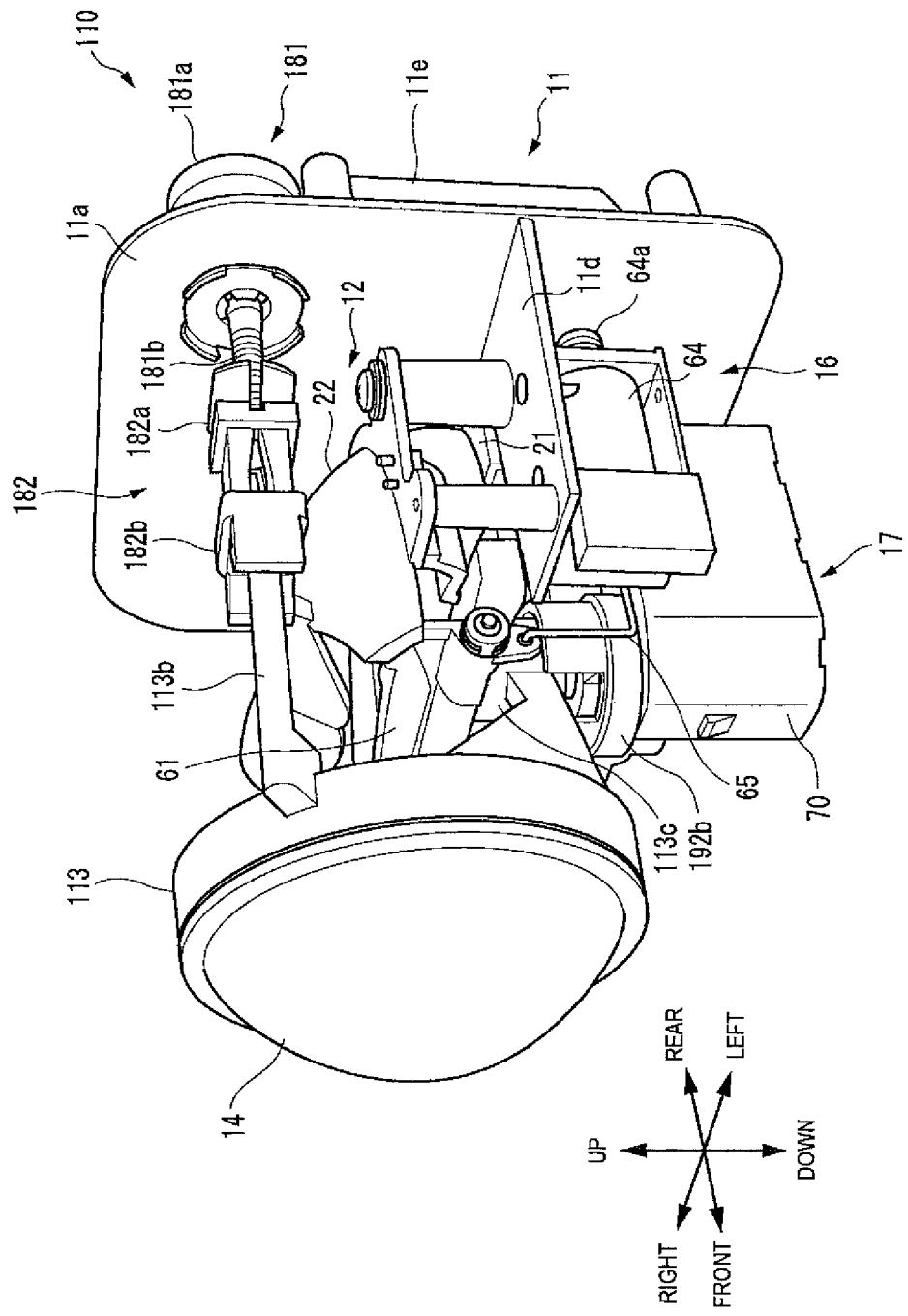
FIG. 11 is a perspective view of a lamp unit according to one or more embodiments of the present invention.

As shown in FIG. 11, the lamp unit 110 includes the heat sink 11, the light source unit 12, a lens holder 113, the projection lens 14, the light distribution control unit 16 and an actuator 117.

Similar to the lamp unit 10 shown in FIG. 1, the lamp unit 110 is assembled to the housing 2 from the inside of the lamp chamber 3. The back plate 11a of the heat sink 11 is opposed to the back wall 2a of the housing 2. An opening (not shown) is formed in the back wall 2a. The portion of the heat sink 11 on which the heat-dissipating fins 11e are formed is inserted through the opening and exposed to the outside of the back wall 2a.

In the rear of the lens holder 113, the actuator 17 is disposed below the support portion 11d of the heat sink 11. The actuator 17 includes the case 70 and the shaft 73. A drive circuit is provided in the case 70 and receives a control signal from a control unit (not shown) that is provided on the outside of the lamp unit 110. The shaft 73 is movable toward and away from the case 70 in accordance with the control signal. The actuator 17 is disposed such that a distal end of the shaft 73 faces forward.

Figure 12:
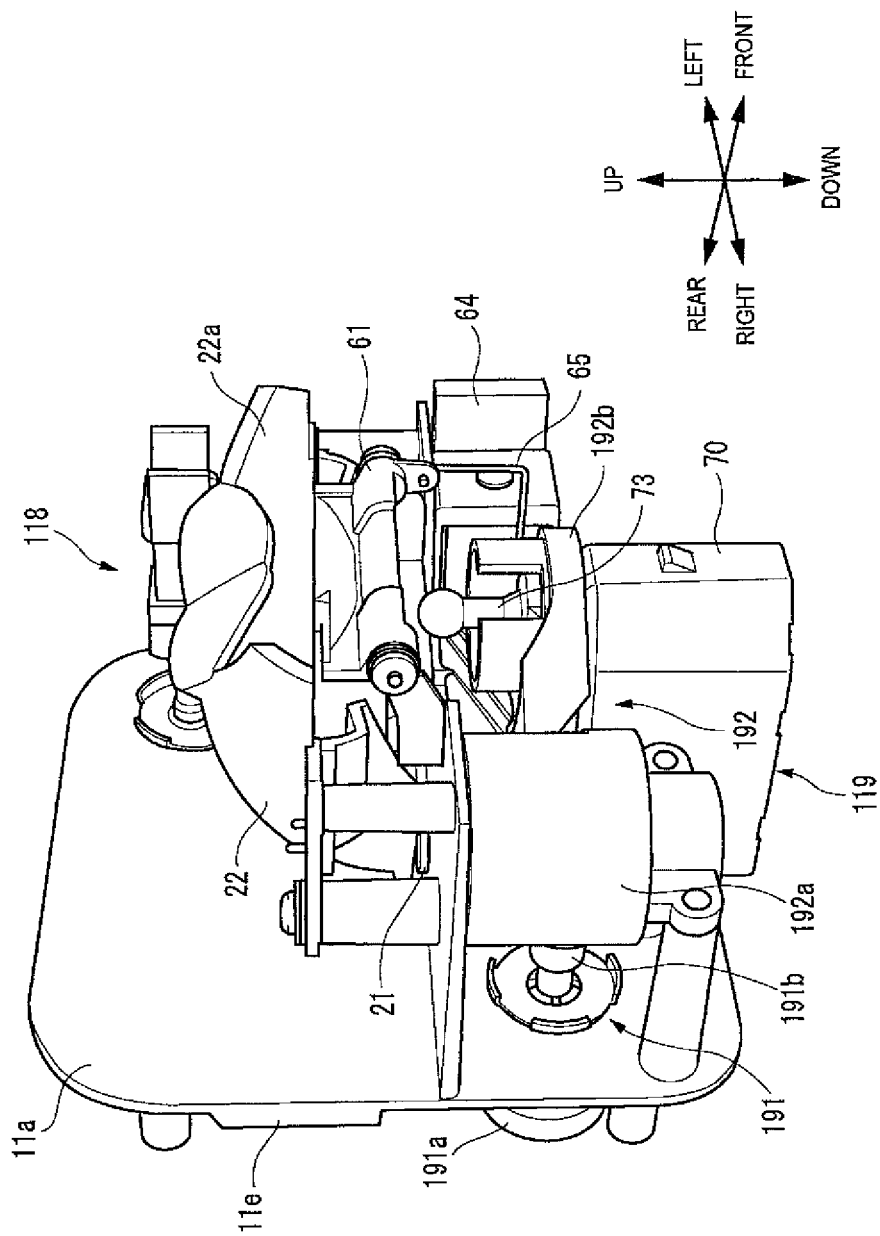
FIG. 12 is a perspective view of a portion of the lamp unit shown in FIG. 11.

FIG. 12 is a front right perspective view of the lamp unit 110 from which the lens holder 113 and the projection lens 14 are removed. The lamp unit 110 further includes a first aiming mechanism 118 and a second aiming mechanism 119. First, a configuration of the second aiming mechanism 119 will be described in detail.

The second aiming mechanism 119 includes a second screw 191 and a joint 192. The second screw 191 includes a head portion 191a and a shaft portion 191b. The joint 192 includes a first link part 192a and a second link part 192b. The head portion 191a is disposed on the rear side of the lower left portion of the back plate 11a of the heat sink 11. The shaft portion 191b extends forward through the back plate 11a of the heat sink 11 and is connected to the first link part 192a of the joint 192. The second link part 192b is coupled to a portion of the case 70 of the actuator 17.

Figure 13:
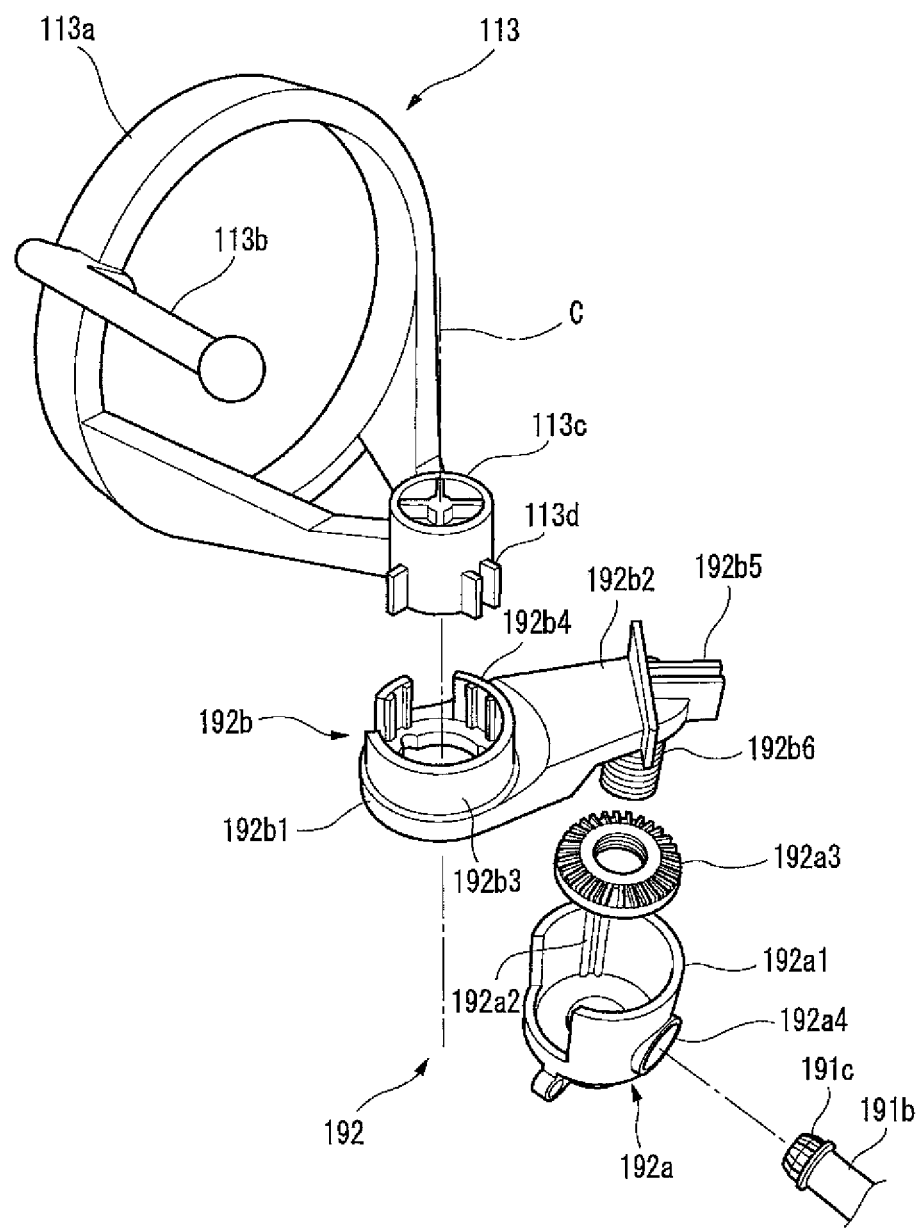
FIG. 13 is an exploded perspective view of a portion of the lamp unit shown in FIG. 11.

As shown in FIG. 13, the first link part 192a is provided with a cylindrical peripheral wall 192a1, a portion of which is cut out. A plurality of guide grooves 192a2, each extending in the vertical direction, is formed on the inner wall of the peripheral wall 192a1. The inside of the peripheral wall 192a1 is a bottomed space.

The second link part 192b includes a bearing portion 192b1 and a slider portion 192b2. The bearing portion 192b1 is provided with a cylindrical peripheral wall 192b3. A plurality of guide grooves 192b4, each extending in the vertical direction, is formed on the inner wall of the peripheral wall 192b3. A lower portion of the bearing portion 192b1 is coupled to the case 70 of the actuator 17. The slider portion 192b2 extends from the lower portion of the bearing portion 192b1 and a plurality of guide ridges 192b5 is formed at a distal end thereof.

A cylindrical portion 192b6 extends downward from the distal end of the slider portion 192b2 and a screw groove is formed on an outer peripheral surface thereof. Meanwhile, the first link part 192a further includes an annular gear 192a3. As the screw groove of the cylindrical portion 192b6 meshes with the screw groove formed on an inner peripheral surface of the annular gear 192a3, the slider portion 192b2 and the annular gear 192a3 are coupled to each other.

By inserting a portion of the slider portion 192b2 into the cutouts formed on the peripheral wall 192a1 in this state, the guide ridges 192b5 are engaged with the guide grooves 192a2 and the cylindrical portion 192b6 and the annular gear 192a3 are disposed inside the peripheral wall 192a1.

An insertion hole 192a4 is formed in the peripheral wall 192a1 and the shaft portion 191b of the second screw 191 is inserted through the insertion hole 192a4. A gear portion 191c is formed at the distal end of the shaft portion 191b and meshes with the annular gear 192a3.

The lens holder 113 includes a lens holding portion 113a, an arm portion 113b and a shaft portion 113c. The lens holding portion 113a is an annular frame and the projection lens 14 is fixed to a front surface of the lens holding portion 113a. The arm portion 113b extends rearward from the upper left side portion of the lens holding portion 113a. The shaft portion 113c is provided on the lower rear side of the lens holding portion 113a and has a cylindrical shape having a movement axis C extending in the vertical direction. A plurality of guide ridges 113d is formed on an outer peripheral surface of the shaft portion 113c.

The shaft portion 113c of the lens holder 113 is held inside of the peripheral wall 192b3 of the bearing portion 192b1. At this time, the guide ridges 113d formed on the shaft portion 113c and the guide ridges 192b4 formed on the inside of the peripheral wall 192b3 are opposed to each other through a slight gap. Therefore, the shaft portion 113c can be vertically slid in the peripheral wall 192b3 and is allowed to slightly rotate about the movement axis C. That is, the shaft portion 113c and the bearing portion 192b1 have the movement axis C as a common movement axis.

The distal end of the shaft 73 of the actuator 17 is coupled with the shaft portion 113c. The shaft portion 113c is coupled in such a way that the shaft portion 113c is allowed to rotate about the shaft 73 while following the movement in the vertical direction of the shaft 73. As the shaft 73 is moved toward and away from the case 70, the shaft portion 113c is vertically slid in the peripheral wall 192b3 and therefore the lens holder 113 is displaced in the vertical direction.

In this state, the movement axis C shared by the shaft portion 113c and the bearing portion 192b1 is arranged such that the movement axis C is perpendicular to the optical axis A of the projection lens 14 mounted on the lens holding portion 113a and passes through a rear focal point of the projection lens 14. In other words, the movement axis C is positioned on a plane perpendicular to the optical axis A and including the rear focal point of the projection lens 14.

When the head portion 191a of the second screw 191 is rotationally operated by a jig (not shown), the gear portion 191c provided at the distal end of the shaft portion 191b is rotated, thereby rotating the annular gear 192a3. Thereby, the screwed position of the cylindrical portion 192b6 and the annular gear 192a3 is changed and the second link part 192b is displaced in the vertical direction while the guide ridges 192b5 are guided by the guide grooves 192a2.

Since the shaft portion 113c of the lens holder 113 is held by the bearing portion 192b1 of the second link part 192b, the lens holder 113 is displaced in the vertical direction along the direction in which the movement axis C extends. Further, since the bearing portion 192b1 is coupled with the case 70, the actuator 17 is also displaced in the vertical direction.

As shown in FIG. 11, the first aiming mechanism 118 includes a first screw 181 and a joint 182. The first screw 181 includes a head portion 181a and a shaft portion 181b. The head portion 181a is disposed on the rear side of the upper right portion of the back plate 11a of the heat sink 11. The shaft portion 181b penetrates the back plate 11a of the heat sink 11 and extends forward. A screw groove is formed on an outer peripheral surface of the shaft portion 181b.

The joint 182 includes a first connecting portion 182a and a second connecting portion 182b. The first connecting portion is formed with a screw hole (not shown) which is screwed with a screw groove formed on an outer peripheral surface of the shaft portion 181b. The second connecting portion 182b clamps the arm portion 113b of the lens holder 113 by a pair of clamping pieces which is arranged side by side in the lateral direction. In this way, the first screw 181 and the lens holder 113 are connected to each other. A groove 182b1 extending in the vertical direction is formed between the pair of clamping pieces. A distal end of the arm portion 113b can be vertically displaced in the groove 182b1.

FIGS. 14A to 14C are left side views for explaining the movement of each part of the lamp unit 110 by the rotation of the second screw 191. FIG. 14A illustrates an initial state.

When the second screw 191 is rotated to the left from the initial state, the second link part 192b is pushed upward through the meshing operation of the gear portion 191c and the annular gear 192a3. At this time, the distal end of the arm portion 113b of the lens holder 113 is slid upward in the groove 182b1 of the joint 182. Accordingly, as shown in FIG. 14A, the optical axis A of the projection lens 14 is translated upward.

On the other hand, when the second screw 191 is rotated to the right, the second link part 192b is pulled downward through the meshing operation of the gear portion 191c and the annular gear 192a3. At this time, the distal end of the arm portion 113b of the lens holder 113 is slid downward in the groove 182b1 of the joint 182. Accordingly, as shown in FIG. 14C, the optical axis A of the projection lens 14 is translated downward.

Specifically, with the operation of the head portion 191a of the second screw 191, the reference position of the actuator 17, i.e., the reference position of the optical axis A of the projection lens 14 in the vertical direction is adjusted.

Figure 15A:
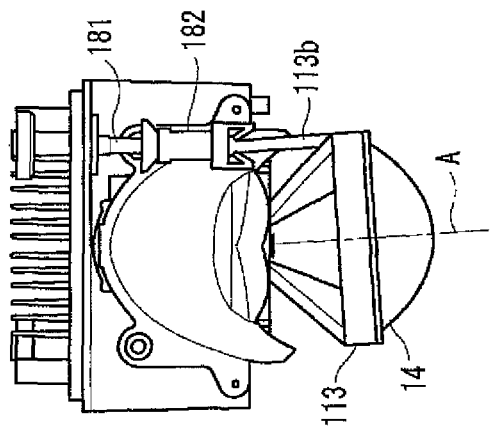
FIGS. 15A to 15C are plan views illustrating the movement of each part by an operation of a first screw of the lamp unit shown in FIG. 11.
Figure 15B:
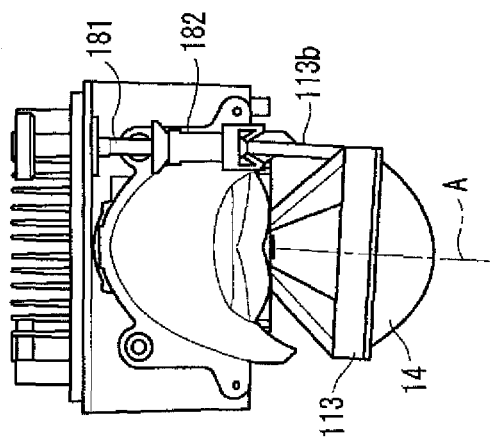

FIGS. 15A to 15B are plan views for explaining the movement of each part of the lamp unit 110 by the rotation of the first screw 181. FIG. 15A illustrates an initial state.

When the first screw 181 is rotated to the left from the initial state, the arm portion 113b of the lens holder 113 is pushed forward via the joint 182. As a result, the shaft portion 113c of the lens holder 113 is rotated to the right about the movement axis C in the peripheral wall 192b3 of the second link part 192b (see FIG. 13). Accordingly, as shown in FIG. 15B, the optical axis A of the projection lens 14 is tilted to the right.

Figure 15C:
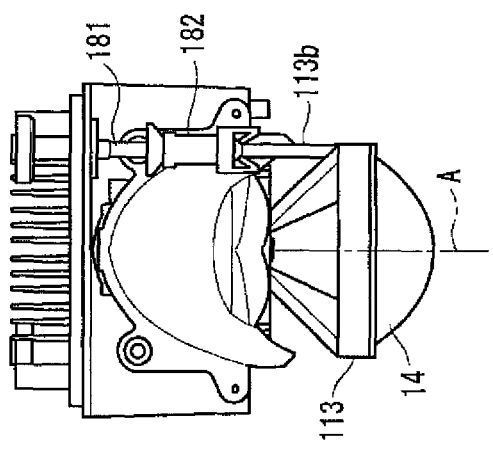

On the other hand, when the first screw 181 is rotated to the right, the arm portion 113b of the lens holder 113 is pulled rearward via the joint 182. As a result, the shaft portion 113c of the lens holder 113 is rotated to the left about the movement axis C in the peripheral wall 192b3 of the second link part 192b (see FIG. 13). Accordingly, as shown in FIG. 15C, the optical axis A of the projection lens 14 is tilted to the left.

Specifically, with the operation of the head portion 181a of the first screw 181, the reference position of the optical axis A of the projection lens 14 in the lateral direction is adjusted.

Figure 16A:
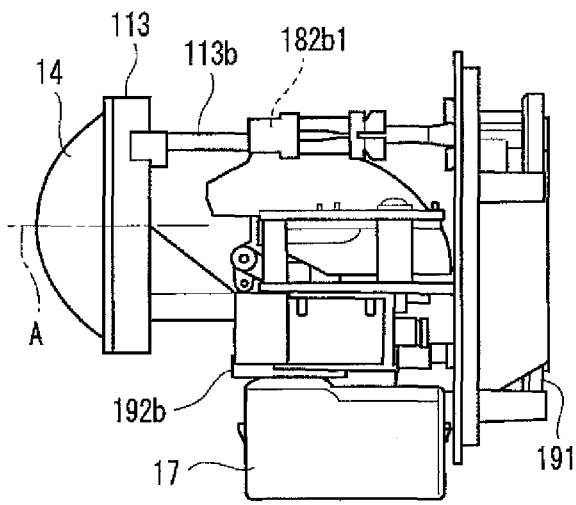
FIGS. 16A and 16B are left side views illustrating the movement of each part by an operation of an actuator of lamp unit shown in FIG. 11.
Figure 16B:
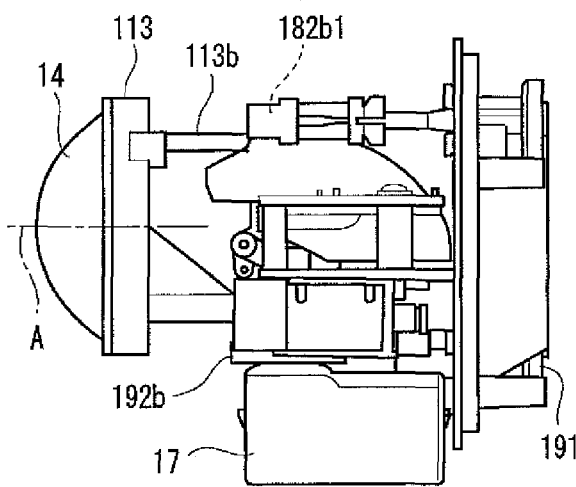

The actuator 17 is a mechanism for changing the direction of the optical axis A of the projection lens 14 into the vertical direction of a vehicle, depending on the change in the vehicle height due to the number of passengers or the loading of baggage. FIG. 16A shows a state (the same state as FIG. 14C) where the optical axis A of the projection lens 14 is somewhat tilted downward by the operation of the second screw 191. FIG. 16B shows a state where the actuator 17 is operated from the state shown in FIG. 16A and the shaft 73 is retracted rearward.

The retraction of the shaft 73 causes the lens holder 13 to be further pulled rearward via the shaft portion 113c. At this time, the arm portion 113b is further slid downward in the groove 182b1 of the joint 182. Accordingly, the optical axis A of the projection lens 14 is further translated downward.

Specifically, by further advancing and retracting the shaft 73 of the actuator 17 with reference to the position of the optical axis A of the projection lens 14 that is adjusted by the operation of the first screw 181 and the second screw 191, the optical axis A can be displaced in the vertical direction.

Figure 17:
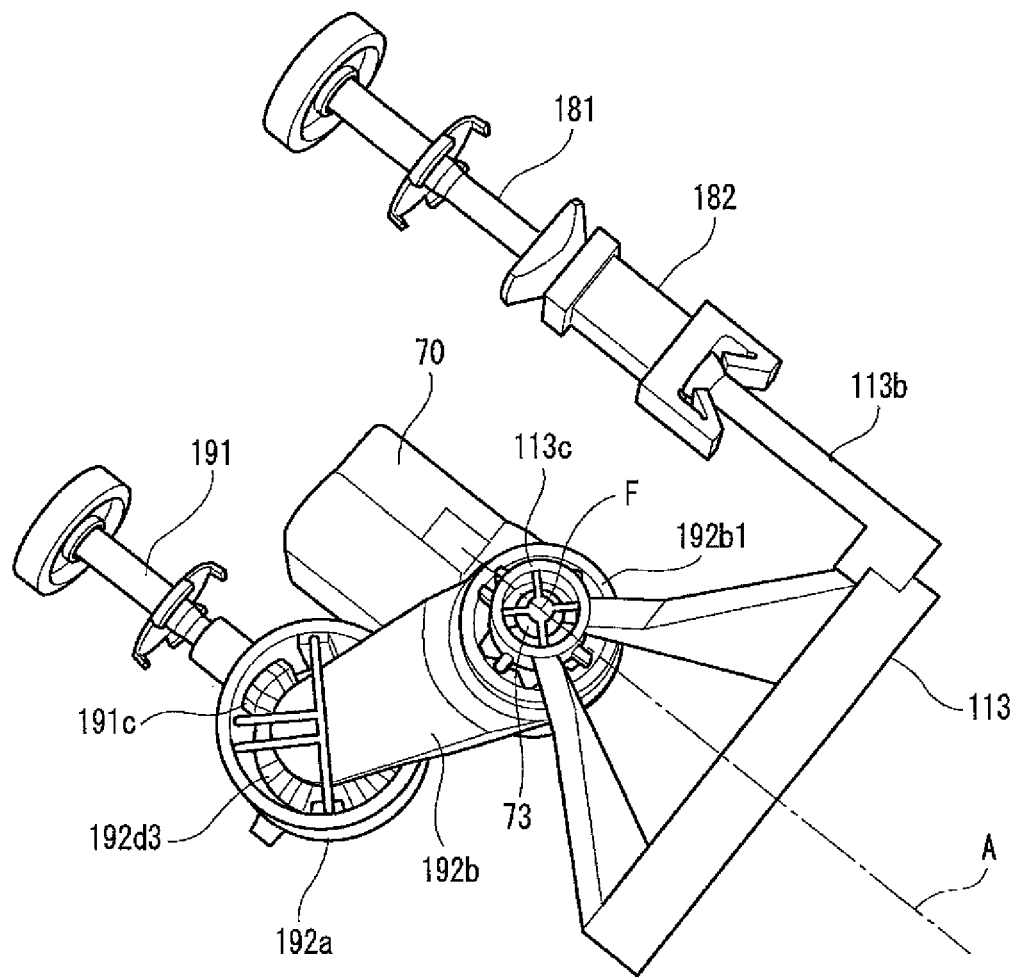
FIG. 17 is a perspective view of parts illustrating a mechanism for adjusting a reference position of an optical axis of a projection lens of the lamp unit shown in FIG. 11.

FIG. 17 is a perspective view separately showing an element, which functions as an adjustment mechanism configured to adjust the reference position of, particularly, the optical axis A of the lamp unit 110.

The shaft portion 113c of the lens holder 113 has the movement axis C (see FIG. 13) (an example of the first member). Since the movement axis C is oriented substantially orthogonal to the drawing sheet of FIG. 17, the movement axis C is omitted in FIG. 17. The bearing portion 192b1 of the second link part 192b of the joint 192 holds the shaft portion 113c (an example of the second member). The shaft portion 113c is disposed such that the movement axis C is poisoned on a plane perpendicular to the optical axis A of the projection lens 14 and including the rear focal point of the projection lens 14.

The rotation of the first screw 181 is converted into the back and forth movement of the joint 182, thereby causing the lens holder 113 to rotate in the lateral direction via the arm portion 113b. In other words, the action by the rotation of the first screw 181 is applied to the shaft portion 113, and the shaft portion 113 is rotated about the movement axis C. As a result, the reference position in the lateral direction (an example of the first direction) of the optical axis A is adjusted.

The rotation of the second screw 191 is converted into the vertical movement of the second link part 192b through the meshing operation of the gear portion 191c and the annular gear 192a3. In other words, the action by the rotation of the second screw 191 is applied to the bearing portion 192b1 and the shaft portion 113c is moved in the direction in which the movement axis C extends. As a result, the reference position in the vertical direction (an example of the second direction) of the optical axis A is adjusted.

According to the above configuration, the actions by the rotations of the first screw 181 and the second screw 191 for adjusting the reference position of the optical axis A in different directions intersecting each other can be integrated into a mechanism having a common movement axis C. In particular, the number of parts and the installation space for the parts can be reduced, as compared to a case where the actions by the rotations of the respective screws are applied to a mechanism having different corresponding axes.

The shaft portion 113c is rotated about the movement axis C by the rotation of the first screw 181 and is moved in the direction in which the movement axis C extends by the rotation of the second screw 191. Here, the movement axis C is positioned on a plane perpendicular to the optical axis A and including the rear focal point F of the projection lens 14. Accordingly, the relative position of the rear focal point F and the light source 21 is not changed. As a result, an operation of adjusting the reference position of the optical axis A does not affect the light distribution by the lamp unit 110.

The shaft portion 113c having the movement axis C is formed as a portion of the lens holder 113. Contrary to this configuration, a member having the movement axis C may be provided on the side of the second link part 192b and a member serving as a bearing may be provided on the side of the lens holder 113. However, the configuration of the present embodiment is desirable since the lens holder 113 can be easily molded.

The lamp unit 110 includes the movable shade 61 for changing the shape of a light distribution pattern that is formed by the light emitted from the light source 21. In this case, the adjustment of the optical axis of an optical system that is capable of forming a plurality of light distribution patterns can be performed only by a pair of screws 181, 191. The reason is that the optical axis to be adjusted is only one.

The first screw 181 and the second screw 191 are extended through the portion of the heat sink 11 on which the heat-dissipating fins 11e are formed. Accordingly, it is possible not only to further reduce the installation space of the lamp unit 110 but also to improve the mounting operability to the headlamp apparatus 1. The reason is that, as shown in FIG. 1, the mounting of the lamp unit 110 to the housing 2 is completed just by inserting the portion having the heat-dissipating fins 11e formed thereon through an opening formed on the back wall 2a of the housing 2 from the inside of the lamp chamber 3.

While the invention has been described with respect to a limited number of embodiments, they are illustrated to facilitate the understanding of the present invention and do not limit scope of the present invention. Those skilled in the art, having benefit of this disclosure, will appreciate that various modifications and changes can be made without departing from the scope of the invention as defined by the appended claims.

The direction in which the optical axis A of the projection lens 14 is displaced by the actuator 17 need not be a direction corresponding to a vertical direction of the vehicle. For example, instead of being a leveling actuator, the actuator 17 may be used as a swivel actuator to displace the optical axis A in a direction corresponding to a lateral direction of the vehicle.

The light distribution control unit 16 with the movable shade 61 may not be provided when, for example, there is no need to form a plurality of light distribution patterns using a single light source 21.

The lighting apparatus on which the lamp unit 10, 10A, 110 according to one or more embodiments of the present invention is mounted is not limited to the headlamp apparatus 1. The present invention is applicable to a lamp to be mounted on any vehicle lighting apparatus, as long as the lamp is used in applications where it is necessary to adjust the reference position of the optical axis A of the projection lens 14.

What is claimed is:

1. A vehicle lamp comprising:
    a light source;
    a projection lens through which at least a portion of light emitted from the light source passes; and
    an adjustment mechanism configured to adjust a reference position of an optical axis of the projection lens,
    wherein the adjustment mechanism comprises:

a first member having a movement axis about which the first member rotates;
a second member holding the first member;
a first screw arranged to adjust the reference position in a first direction; and
a second screw arranged to adjust the reference position in a second direction intersecting the first direction,
wherein the first member is arranged such that the movement axis is positioned on a plane perpendicular to the optical axis and including a focal point of the projection lens,
wherein an action by a rotation of the first screw and an action by a rotation of the second screw are applied to one of the first member and the second member,
wherein the vehicle lamp further comprises a housing which defines an enclosed space in which the light source and the projection lens are disposed,
wherein the first screw is disposed through the housing such that part of the first screw is exposed outside the housing, and
wherein the second screw is disposed through the housing such that part of the second screw is exposed outside the housing.

2. The vehicle lamp according to claim 1,
wherein the rotation of the first screw causes one of the first member and the second member to rotate around the movement axis, and
wherein the rotation of the second screw causes one of the first member and the second member to move in a direction in which the movement axis extends.

3. The vehicle lamp according to claim 2, wherein the action by the rotation of the first screw and the action by the rotation of the second screw are both applied to one of the first member and the second member.

4. The vehicle lamp according to claim 3, wherein the action by the rotation of the first screw and the action by the rotation of the second screw are both applied to the first member.

5. The vehicle lamp according to claim 1, further comprising a holder holding the projection lens, wherein the first member is provided as a portion of the holder.

6. The vehicle lamp according to claim 1, wherein the first direction corresponds to a vertical direction of a vehicle on which the vehicle lamp is mounted.

7. The vehicle lamp according to claim 6, further comprising
an actuator including a drive shaft to displace the optical axis in the first direction,
wherein the first screw and the drive shaft are arranged in a parallel manner along a direction in which the first screw and the drive shaft extend.

8. The vehicle lamp according to claim 1, further comprising a movable shade to change a shape of a light distribution pattern to be formed by the light emitted from the light source.

9. The vehicle lamp according to claim 1, further comprising a heat sink to which the light source is fixed, wherein the first screw and the second screw are arranged to extend through the heat sink.

10. The vehicle lamp according to claim 1,
wherein the first member is configured to be rotated about the movement axis while contacting the second member by rotation of the first screw, and
wherein the first member is configured to be slid along the movement axis while contacting the second member by rotation of the second screw.

11. The vehicle lamp according to claim 1, further comprising:
a lens holder that holds the projection lens,
wherein the adjustment mechanism is configured to move the lens holder with respect to the light source to adjust the reference position of the optical axis of the projection lens.

12. The vehicle lamp according to claim 11, further comprising:
a support portion on which the light source is fixed,
wherein the second member is provided to the support portion at positions interposing the projection lens, and
wherein the lens holder includes a pair of shaft portions, each having the first member at a distal end thereof, which is held by a corresponding one of the second members.

13. The vehicle lamp according to claim 12,
wherein the second member comprises a groove in which the first member is held to be slidable and rotatable.

14. The vehicle lamp according to claim 1,
wherein the first screw comprises a first head portion and a first screw portion, and the second screw comprises a second head portion and a second screw portion, and
wherein the first and second head portions are disposed outside the housing.

15. A vehicle lamp comprising:
a light source;
a projection lens through which at least a portion of light emitted from the light source passes; and
an adjustment mechanism configured to adjust a reference position of an optical axis of the projection lens,
wherein the adjustment mechanism comprises:
a first member having a movement axis about which the first member rotates;
a second member holding the first member;
a first screw arranged to adjust the reference position in a first direction; and
a second screw arranged to adjust the reference position in a second direction intersecting the first direction,
wherein the first member is arranged such that the movement axis is positioned on a plane perpendicular to the optical axis and including a focal point of the projection lens,
wherein an action by a rotation of the first screw and an action by a rotation of the second screw are applied to one of the first member and the second member,
wherein the first member is configured to be rotated about the movement axis while contacting the second member by rotation of the first screw, and
wherein the first member is configured to be slid along the movement axis while contacting the second member by rotation of the second screw.

16. A vehicle lamp comprising:
a light source;
a projection lens through which at least a portion of light emitted from the light source passes; and
an adjustment mechanism configured to adjust a reference position of an optical axis of the projection lens,
wherein the adjustment mechanism comprises:
a first member having a movement axis about which the first member rotates;
a second member holding the first member;
a first screw arranged to adjust the reference position in a first direction; and
a second screw arranged to adjust the reference position in a second direction intersecting the first direction, wherein the first member is arranged such that the movement axis is positioned on a plane perpendicular to the optical axis and including a focal point of the projection lens, wherein an action by a rotation of the first screw and an action by a rotation of the second screw are applied to one of the first member and the second member, wherein the vehicle lamp further comprises a lens holder that holds the projection lens, and wherein the adjustment mechanism is configured to move the lens holder with respect to the light source to adjust the reference position of the optical axis of the projection lens.

* * * * *